No. 726,713. PATENTED APR. 28, 1903.
B. LIMBERG.
WAGON UNLOADING DEVICE.
APPLICATION FILED DEC. 11, 1902.
NO MODEL.
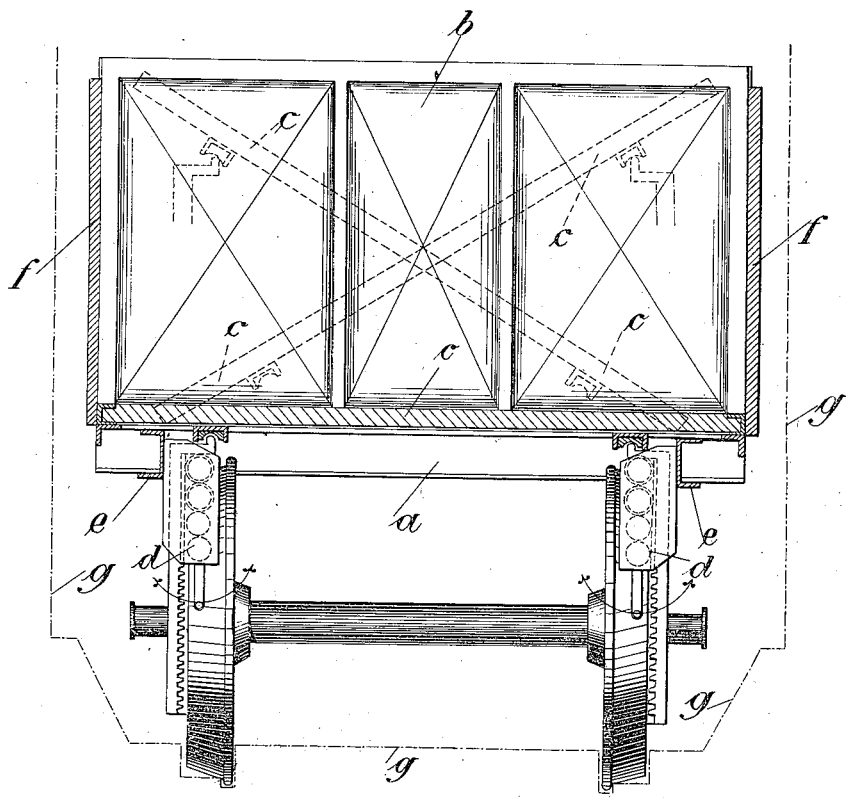
WITNESSES
INVENTOR

UNITED STATES PATENT OFFICE.

BRUNO LIMBERG, OF KELSTERBACH, GERMANY.

WAGON-UNLOADING DEVICE.

SPECIFICATION forming part of Letters Patent No. 726,713, dated April 28, 1903.

Application filed December 11, 1902. Serial No. 134,853. (No model.)

*To all whom it may concern:*

Be it known that I, BRUNO LIMBERG, a subject of the German Emperor, residing at Kelsterbach-on-the-Main, Germany, have invented certain new and useful Improvements in Wagon-Unloading Devices, of which the following is a specification.

The subject of the present invention is an unloading device for goods-wagons, in which the floor of the wagon is removed in a known manner from the wagon-frame, raised, and can be either tilted toward the four sides or can be raised horizontally. In distinction from the already-known devices of this kind the subject of the present invention possesses the characteristic that the devices serving to raise the wagon-floor are arranged outside the wagon-frame and below the floor and the loading-surface in suitable positions, by which means a reduction of the loading-surface on account of the raising devices is obviated, but at the same time an overstepping of the usual width of the track in the unloading and normal positions is avoided.

In the accompanying drawing, which shows a portion of the wagon to which my invention is applied, $a$ is a cross-beam of the underframe of the wagon, $b$ is the front side of the wagon, and $f$ the longitudinal side thereof, which can be opened out upward in such a way that when turned into their highest position they cannot automatically fall back again. On the cross-beams $a$ and upon the longitudinal carriers $e$ of the underframe the floor $c$ lies free. This floor for the sake of strengthening it can be surrounded with a frame of angle-iron. On the longitudinal carriers $e$ are arranged each of four rack or other devices, each pair of which may advantageously be operated by a common crank on a shaft carrying pinions engaging the racks, as indicated in dotted lines. By a simultaneous turning of the cranks on both sides of the wagon the floor $c$ will be raised, lying horizontal. If, however, only the gear on one side of the wagon is actuated, the floor assumes a canted position in one of four directions, as shown in dotted lines, so that the contents of the wagon are caused to slide, and the wagon is quickly unloaded.

An important point is that no portion of the floor $c$, in whatever position it may be, protrudes beyond the general outline of the car, as indicated by the dotted line $g$. This makes it possible to discharge the contents of a car standing on one track onto a neighboring track without causing any risk to passing trains by reason of the protrusion of any part of said car into the path of said trains.

What I claim, and desire to secure by Letters Patent of the United States, is—

1. A wagon or car having a stiff floor entirely covering its bottom, and mechanism for tilting the floor as a whole, sidewise or endwise, substantially as described.

2. A car having a stiff floor entirely covering its bottom and rack devices at the corners arranged to move the floor as a whole to discharge the contents in any direction; substantially as described.

In testimony whereof I have hereunto set my hand in the presence of two witnesses.

BRUNO LIMBERG.

Witnesses:
ERICH KÜHN,
JEAN GRUN.